Oct. 31, 1950      L. L. WHITNEY      2,528,024
BRAKE BEAM WITH REVERSIBLE FULCRUM
Filed March 30, 1946
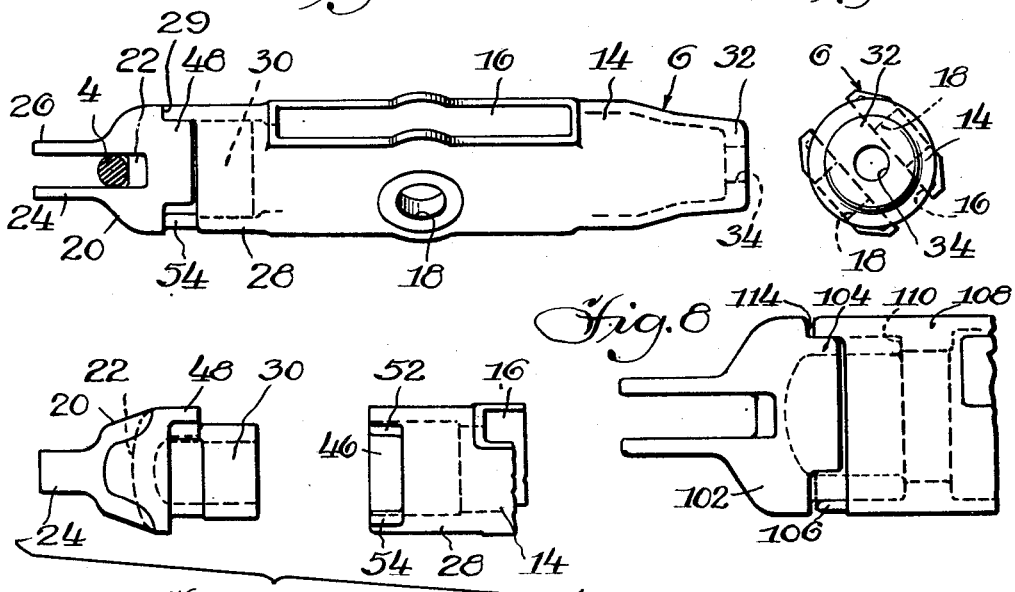
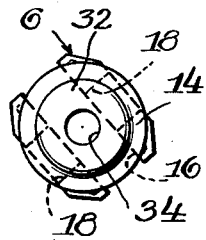
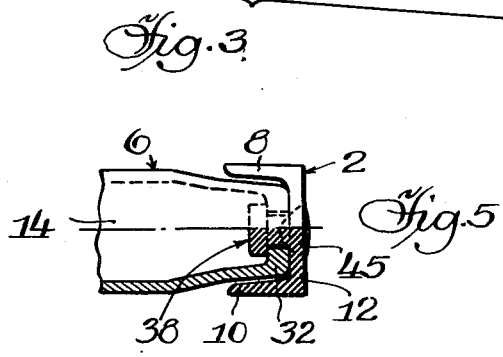
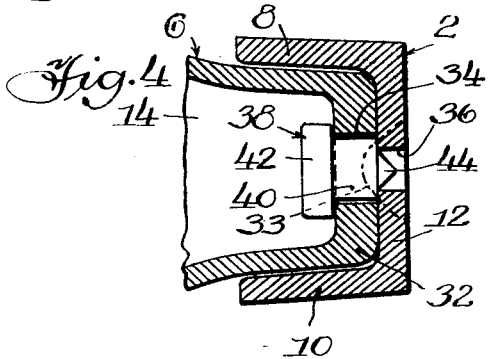
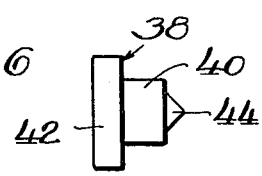
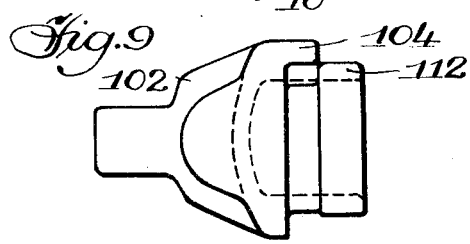
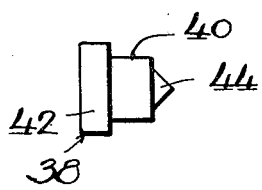
INVENTOR.
Loren L. Whitney
BY
Ωm O.B. Garner
Atty.

Patented Oct. 31, 1950

2,528,024

UNITED STATES PATENT OFFICE 2,528,024

BRAKE BEAM WITH REVERSIBLE FULCRUM

Loren L. Whitney, Hammond, Ind., assignor to American Steel Foundries, Chicago, Ill., a corporation of New Jersey Application March 30, 1946, Serial No. 658,515

2 Claims. (Cl. 188—229.6)

My invention relates to brake beams and particularly to an improved form of fulcrum for use in a truss type brake beam comprising a channel compression member and a rod tension member with the fulcrum extending therebetween and secured thereto.

An object of my invention is to design a novel fulcrum or strut and means for securing the same to the compression and tension members of a brake beam.

Another object of my invention is to provide a novel revsible fulcrum or strut pivotally connecting the compression and tension members of a brake beam and comprising means for positively limiting pivotal movement of the same relative to the brake beam in opposite directions to the requisite angle for reception of the brake lever to permit use of the beam in either a left-hand or right-hand arrangement.

A further object of my invention is to design a brake beam structure such as above described wherein the fulcrum comprises two relatively rotatable members, one member being formed with cylindrical ends with one end receiving therewithin and having engagement with a detachable cylindrical portion of the other tension rod saddle or head member and the other end being seated against the channel compression member and pivotally secured thereto by a swivel pin fixed to the latter, whereby said body is capable of rotation on its longitudinal axis to permit tilting of the brake lever carried thereby to one side or the other as the particular location of the brake beam may require, stop means being provided on the engaged portions of said members to limit relative rotation therebetween in opposite directions for positioning the fulcrum into one of its normal angular operative positions.

An important feature of my invention is the novel manner for pivotally connecting the fulcrum and the compression member by the employment of a pivot pin having a cylindrical body portion extending through a complementary opening in a cylindrical end of the fulcrum and seated against the rear web of the compression member and welded thereto through an opening in said rear web, the opposite end of said body portion being provided with a head in bearing engagement with an adjacent portion of the fulcrum during relative pivotal movement of the fulcrum and compression member to prevent disengagement of the fulcrum from the pin and thereby the compression member, said head being elongated to afford an extensive bearing area and also to permit passage of the pin through the brake lever slot in the fulcrum for assembly purposes.

A further object of my invention is to provide a simple and efficient reversible fulcrum designed to be readily manufactured at low cost.

In the drawings,

Figure 1 is a side elevation of a brake beam fulcrum together with the tension member of the brake beam shown in section;

Figure 2 is a rear elevation of the same with the tension member removed;

Figure 3 is a fragmentary top plan view of the fulcrum with the saddle and body portions detached;

Figure 4 is an enlarged fragmentary sectional view of the fulcrum and compression member of the brake beam taken lengthwise of the fulcrum and illustrating the compression member, the fulcrum and connecting pin in assembly and prior to welding of the pin to the compression member;

Figure 5 is a view similar to Figure 4 with the upper half shown in elevation and the lower half in section, said view illustrating the pin welded to the compression member;

Figures 6 and 7 are views illustrating my novel swivel pin, Figure 6 being a top elevation thereof and Figure 7 being a side elevation thereof as seen in Figure 4;

Figure 8 is a fragmentary side elevation comparable to the view of Figure 1, illustrating a modified form of my invention; and Figure 9 is a top plan view of the saddle member illustrated in Figure 8.

Referring to the structure illustrated in the drawings, it will be noted that I have disclosed my invention in connection with a truss type brake beam including a compression member 2, a tension member 4, and a fulcrum or strut, generally designated 6, extending between said members, said compression member 2 being of channel section and comprising spaced walls 8 and 10 and a connecting wall 12 extending therebetween and merging therewith, said tension member 4 being of round bar stock.

The fulcrum 6 comprises a tubular main body portion 14 formed centrally thereof with the usual brake lever slot 16 and the aligned openings 18, 18 affording a means of connection to the associated brake lever (not shown). The fulcrum 6 also comprises a saddle or seat portion or head 20 affording a seat 22 at one end thereof for the tension member 4, said seat being convexly formed and preferably having spaced parallel walls 24 and 26 receiving said tension member therebetween and preventing relative rotation between said saddle and member.

The body portion 14 of the fulcrum is pivotally connected at opposite ends respectively to the saddle 20 and the compression member 2 to permit rotation of the body portion 14 on its longitudinal axis in opposite directions relative to the compression and tension members of the beam so that the associated brake lever may be tilted to one side or the other as the particular location of the beam may require. For this purpose, the body portion 14 is provided at one end thereof with a cylindrical socket 28 adapted to receive a reduced cylindrical end portion or sleeve 30 of the saddle 20 for bearing engagement therewith, said sleeve 20 annularly abutting the shoulder of said saddle at 29 (Figure 1). At its opposite end the tubular body portion 14 is of reduced diameter for reception between the spaced walls 8 and 10 of the compression member and is provided with an end wall 32 in abutment with the wall 12 of said member, said wall 32 having an opening 34 therein in alignment with a relatively smaller opening 36 in the wall 12. To pivotally secure the body portion of the fulcrum to the compression member, a swivel pin, generally designated 38, is formed with a central cylindrical portion 40 received within the opening 34 and is positioned with one end thereof in abutment with the margins of the opening 36 in the wall 12 of the compression member, said portion 40 having a length slightly greater than the thickness of the wall 32, as clearly seen in Figure 4, the one end of said pin being provided with an elongated head 42 in bearing engagement with the wall 32 of the fulcrum and the other end having a conical point 44 received within the opening 36 in the wall 32 of the compression member, as shown in Figure 4, and pin may then be welded to the rear wall 12 of the compression member through the opening 36 in said wall, the resultant plug weld 45, as clearly shown in Figure 5, integrally uniting the pin and compression member. It will be apparent from the foregoing discussion that the body portion 14 of the fulcrum will pivot about its pivotal connections to the saddle 20 and the compression member 2 to permit the brake lever to be adjusted to the desired angle from the vertical and thus permit the use of the brake beam at either end of the truck. It may be noted that under load conditions when the compression member has the tendency to separate itself from the fulcrum member, as will be understood by those skilled in the art, the head 42 of the pin will prevent disengagement of the fulcrum from the pin and thereby the compression member, whereby the fulcrum and compression member will be maintained in assembly under service conditions.

To limit rotation of the body portion 14 of the fulcrum in opposite directions for locating the brake lever in a desired position, the body portion of the fulcrum has an arcuate recess 46 in the extremity of the socket 28 thereof adapted to receive a lug 48 projecting from the collar of the saddle 20, said recess being defined at opposite ends thereof by radially extending and angularly arranged surfaces 52 and 54 engageable with said lug to limit rotation of the body portion 14 to 40° right or left of the vertical.

In the assembly of the brake beam compression and tension members and the fulcrum, the saddle 20 and body 14 of the fulcrum in assembly are positioned between said members with the saddle in engagement with the tension member and the end wall 32 of the fulcrum body 14 seated within the channel and against the wall 12 of the compression member. Thereafter, the pin 38 is inserted by any suitable tool through the slot 16 of the fulcrum and into the opening 34 in the wall 32 of the fulcrum. It may be noted that the width of the head of the pin is such as to readily allow passage of the pin through the fulcrum slot 16 while the length of said head affords a substantial bearing area for engagement with the adjacent wall 32 of the fulcrum. Also, the conical point of the pin assists in readily centering the pin in aligned openings 34 and 36 in the parallel walls 32 and 12 of the fulcrum and compression member, respectively. The pin may then be welded to the wall 12 of the compression member to complete the assembly of the fulcrum with the compression and tension members, the outline of said completed weld being indicated by the dotted line 33 (Figure 4).

It will be apparent from the foregoing that my novel reversible fulcrum is of simple design and can be readily manufactured at low cost inasmuch as the fulcrum may be formed of either cast steel or of malleable iron castings. In the case of being formed of cast steel, a minimum of machining will be required for it is only necessary to machine the engaging cylindrical portions of the saddle 20 and body portion 14 of the fulcrum. If the fulcrum is made of malleable iron castings, it is believed that these portions could be cast sufficiently accurate to eliminate this machining operation without affecting the satisfactory functioning of the fulcrum.

The modification illustrated in Figures 8 and 9 is generally similar to that already described, differing therefrom only in the manner in which the saddle engages the main body portion of the fulcrum. In this modification the saddle member 102 has the stop 104 which may abut seats on the annular flange 106 of the sleeve 108 as in the previous modification. In this arrangement, however, the sleeve 108 is formed with an interior annular shoulder at 110 against which the annular extremity 112 of the saddle member 102 may seat. The portion 112 is of such length as to afford clearance as at 114 between the saddle member 102 and the sleeve 108 so that the thrust between these two members takes place along the shoulder 110 while at the same time full bearing against said sleeve is afforded by the member 112 which is housed therein. This modification thus provides an annular seat 110 extending entirely around the inner circumference of the sleeve 108 so that adequate thrust bearing is afforded by the saddle portion and the sleeve portion of the fulcrum.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a truss type brake beam having tension and compression members, said compression member comprising spaced substantially parallel walls and a web interconnecting said walls, a reversible fulcrum intermediate said members and comprising a body having a cylindrical hollow butt at one end with a transverse wall seated against said web, a pivot element welded to said web and extending through an opening in said transverse wall to afford a pivotal connection between said body and said compression member, said body having a cylindrical socket portion at its other end, a saddle member seated at one end against said tension member and having spaced webs embracing said tension member, a shank at the other end of said saddle member extending into said socket portion and in engagement therewith along substantially the full length thereof and affording a pivotal connection between said body and said tension member, engaging abutment surfaces on said socket portion and said saddle member extending transversely of the axis of rotation of said body, and a stop lug on one side of said saddle member extending into a slot in said socket portion for abutment with the margins of said slot for limiting rotation of said body on said element and said shank, said slot being open through a side of said socket portion and extending inwardly from the outer end of said socket portion, said slot and lug being visible from one end of said beam.

2. In a truss type brake beam haing tension and compression members, a reversible fulcrum between said members and comprising a body with a lever slot intermediate its ends, said body having hollow substantially cylindrical ends, one of said ends being closed and seated against said compression member, a pivotal connection between said compression member and said last-mentioned end including a pivot element integral with said compression member and extending into said end, a head mounted on said tension member and having a shank extending into said other end of said body to provide a pivotal connection between the body and said tension member, engaged abutment surfaces on said last-mentioned end and said head extending transversely of the axis of rotation of said body, and a lug at one side of said head extending into a slot in said last-mentioned end for abutment with the margins of the slot for limiting rotation of said body, said slot extending through one side of said body and said lug and slot being visible from one end of said beam.

LOREN L. WHITNEY.

REFERENCES CITED

The following references are of record in the file of this patent:

UNITED STATES PATENTS

| Number | Name | Date |
| --- | --- | --- |
| 1,346,054 | Pennington | July 6, 1920 |
| 1,354,650 | Huntoon | Oct. 5, 1920 |
| 1,407,202 | Kubler | Feb. 21, 1922 |
| 1,439,906 | Maher | Dec. 26, 1922 |
| 1,498,374 | Hedgcock | June 17, 1924 |